2,635,737

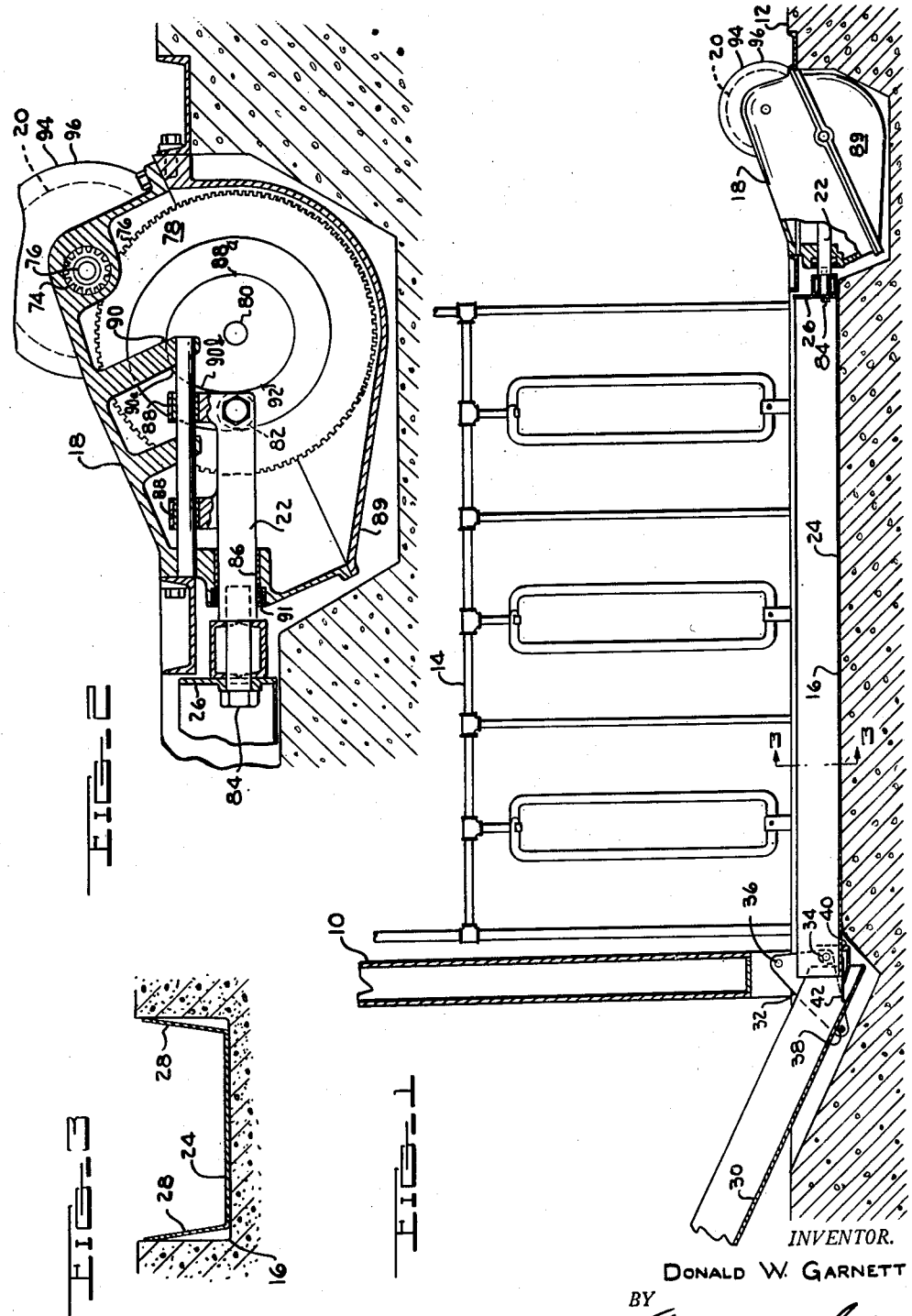
April 21, 1953     D. W. GARNETT     2,635,737
BARN CLEANER
Filed Feb. 2, 1950     4 Sheets-Sheet 1
INVENTOR.
DONALD W. GARNETT
BY
ATTORNEY April 21, 1953 D. W. GARNETT 2,635,737
BARN CLEANER
Filed Feb. 2, 1950 4 Sheets-Sheet 2
FIG_4
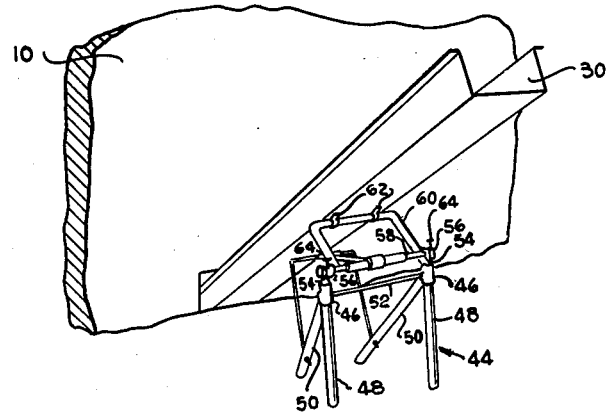
FIG_5
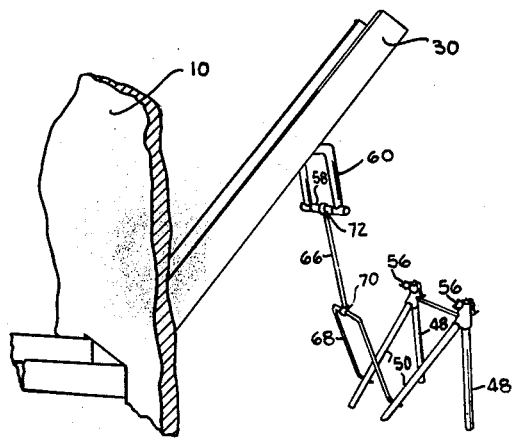
INVENTOR.
DONALD W. GARNETT
BY
*Arthur M. Smith*
ATTORNEY April 21, 1953     D. W. GARNETT     2,635,737
BARN CLEANER
Filed Feb. 2, 1950     4 Sheets-Sheet 3
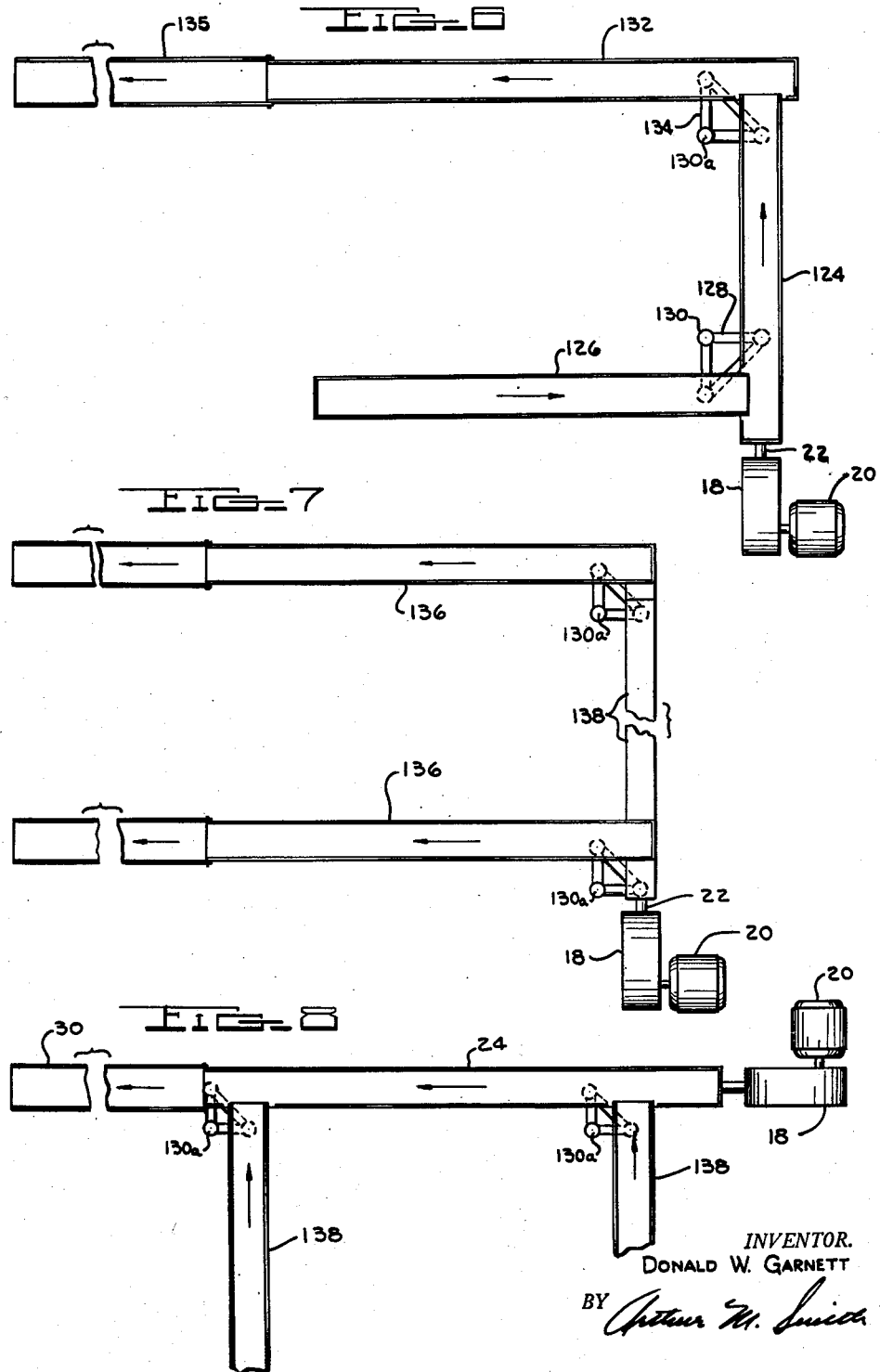
INVENTOR.
DONALD W. GARNETT
BY Arthur M. Smith
ATTORNEY April 21, 1953     D. W. GARNETT     2,635,737
BARN CLEANER
Filed Feb. 2, 1950     4 Sheets-Sheet 4
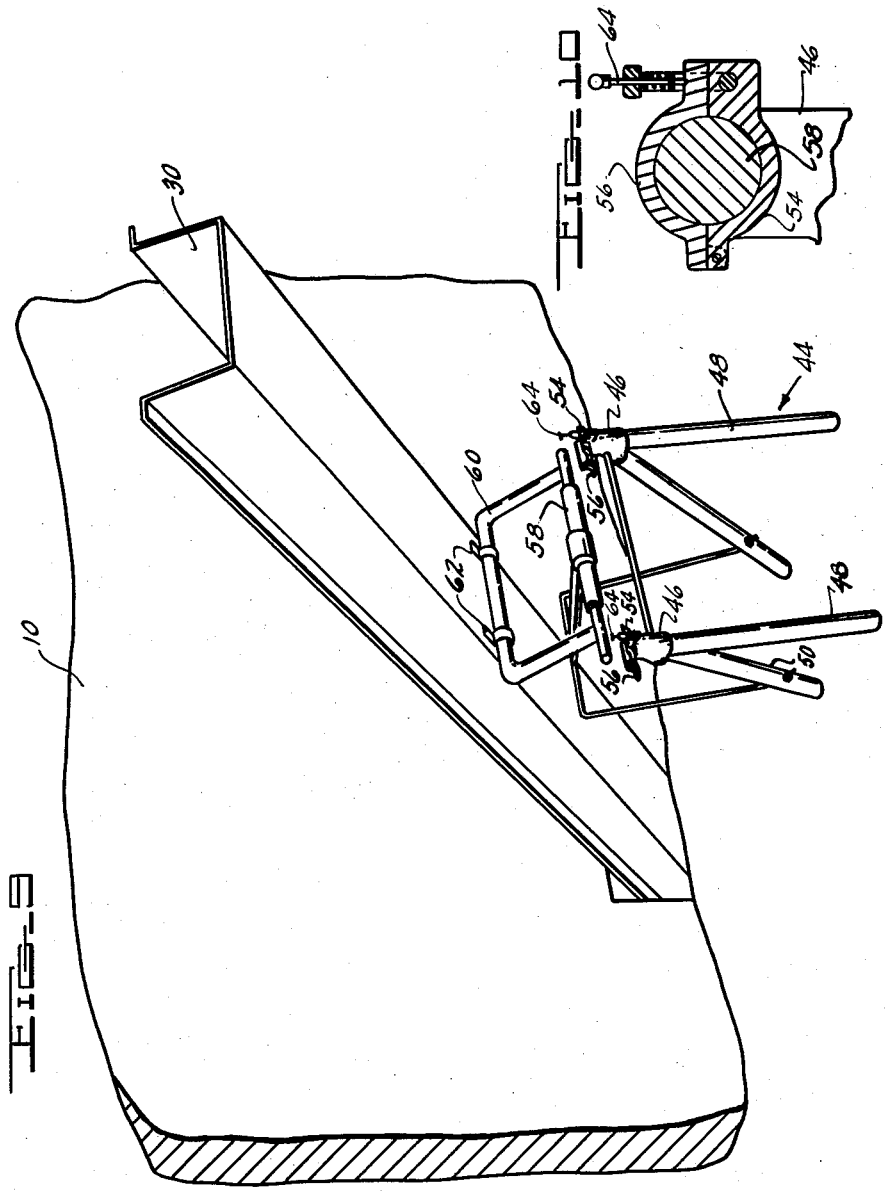
INVENTOR.
DONALD W. GARNETT
BY
ATTORNEY Patented Apr. 21, 1953

UNITED STATES PATENT OFFICE 2,635,737

BARN CLEANER

Donald W. Garnett, Grand Ledge, Mich., assignor to Thomas F. Keegan, Lansing, Mich.

Application February 2, 1950, Serial No. 142,057

3 Claims. (Cl. 198—220)

The present invention relates to a barn cleaner and more particularly to a barn cleaner for removing manure and litter accumulated at the rear of cattle, horses or other animals when tied in stalls or stanchions, the cleaner acting to convey the manure and litter from the barn to a manure spreader or manure storage space.

Barn cleaning by the use of mechanical equipment has not been widely adopted by farmers. One reason has been the relatively high cost of the available equipment, both as to the initial installation and the operation and maintenance of the unit. To be acceptable for widespread farm use, such units must be simple and rugged in construction to permit installation and use by unskilled labor and to insure a long life thereof. The unit also must be so designed that any repair work which may be required can be easily performed by the user. Also, such a unit must be so economical to operate that it will show a savings over the cost of performing the work manually.

In prior barn cleaning units in which conveyors have been used, the exposed moving parts have created hazards to the animals in the barn as well as to farmers and others working about the barn. In order for a barn cleaner unit to be satisfactory for widespread adoption it is necessary that the exposed moving parts of the unit be operated with complete safety to animals and workmen when in the immediate proximity thereof.

A satisfactory barn cleaner must also retain the liquid fertilizer elements present in the animal urine absorbed by the litter.

A satisfactory barn cleaner also must operate efficiently in all types of weather conditions and under widely varying temperature conditions.

All of the above requirements for a satisfactory barn cleaning unit have been considered in the development of the present barn cleaner which provides a mechanical barn cleaning unit which is adapted for widespread use by farmers and animal raisers throughout the country.

An object of the present invention is to provide a barn cleaner which is characterized by its simple and rugged construction permitting the economical installation thereof, the cleaner being characterized by its relatively low installation, operation and maintenance costs; the cleaner being further characterized by its ability to operate efficiently under all types of weather conditions and temperatures and without hazard to either animals or humans; and which is further characterized by its ability to provide optimum conditions for assuring cleanliness and sanitation within the barn.

It is a further object of the present invention to provide a barn cleaner including conveyer troughs operably joined to permit conveying from one elevation to another and in a plurality of horizontal directions, in a most efficient and safe manner, and which provides the optimum conditions for assuring cleanliness and sanitation of the equipment and the barn in which it is installed.

It is still another object of the present invention to provide a barn cleaner including a drive mechanism for operating conveyer troughs, the cleaner being characterized by its economical construction and its ability to operate at low cost, and which is safely operated in the presence of both the animals and the workmen, the cleaner being designed to permit satisfactory operation under all types of weather conditions and temperatures.

It is a further object of the present invention to provide a barn cleaner which may be sold as a unit and installed readily by the user in existing barn structures.

Other objects of this invention will appear in the following description and appended claims, reference being had to the accompanying drawings forming a part of this specification wherein like reference characters designate corresponding parts in the several views.

In the drawings:

Fig. 1 is a fragmentary view of a barn partially in section showing a portion of the barn cleaner of the present invention.

Fig. 2 is a fragmentary sectional view showing the transmission unit of the barn cleaner shown in Fig. 1.

Fig. 3 is a sectional view taken on the line 3—3 of Fig. 1.

Fig. 4 is a fragmentary view of a portion of the barn cleaner shown in Fig. 1 including a support means suitably constructed to permit reciprocal movement of the discharge trough while holding it at the desired angle of inclination.

Fig. 5 is a view similar to that of Fig. 4 showing the discharge trough supported in an inoperative position by the support means.

Figs. 6, 7, and 8 are essentially diagrammatic views of the present barn cleaner showing various installations of conveyer trough units to meet particular installation conditions and showing modified forms of driving connections between the conveyer trough units.

Fig. 9 is an enlarged view of the portion of barn cleaner illustrated in Fig. 4 showing the discharge trough disconnected from the support means.

Fig. 10 is an enlarged fragmentary sectional view of a portion of the support means.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The present invention is designed for use in conventional barns having stalls or stanchions in which cattle, horses and the like are secured, and which has a trench extending the length of the stalls or stanchions behind the animal secured therein. Included in the invention are troughs adapted to move longitudinally of the trenches and power transmitting means for imparting reciprocating motion to the trough for conveying manure and the like to a discharge end of said trough. When it is desired to convey the manure and the like to a higher elevation an inclined trough is suitably secured to the discharge end of the horizontal trough to be reciprocated thereby for conveying the manure to a manure spreader or manure storage space. Suitable means are provided for inclining said inclined trough to any desired angle of inclination.

Referring now to Fig. 1 of the drawings, a portion of a barn is shown including the end wall 10 and the floor 12. Conventional stanchions 14 are shown for retaining cattle, horses or other animals in fixed spaces within the barn. At the end of the space allotted to each of the animals is a conventional trench 16 for receiving urine, manure and the like from the animals. These features are conventional in barns and are not included in the present invention.

The apparatus of the present invention comprises a power transmission unit 18 securely anchored and suitably driven by an electric motor 20. If desired, a gasoline engine or other power source may be used in place of the electric motor 20. Rigidly secured to the pusher rod 22 of the power transmission unit 18 is a horizontally disposed trough 24 adapted to be moved longitudinally within the trench 16. The trough 24 is closed at its one end to which the pusher rod 22 is secured, and is open at its other end to provide a discharge outlet for the manure, litter, and the like, contained within said trough 24. As can be seen in Fig. 3 of the drawings, the side walls of the trough 24 are inclined upwardly and outwardly to provide sliding contact with the side walls of the trench 16.

At the discharge end of the trough 24 is an inclined trough 30 which is suitably connected to trough 24 by a pair of bell cranks 32. Each bell crank 32 is pivotally secured at its apex by a pin 34 to the side of the trough 24. The substantially vertical arm of each bell crank 32 is pivotally mounted on a pin 36 which is securely anchored adjacent the end wall 10 of the barn. The other arm of each bell crank is pivotally connected to a shaft 38 which extends between them, said shaft 38 being hingedly attached to the bottom of the trough 30. As can be seen in Fig. 1 of the drawings, the length of each bell crank arm attached to the inclined trough 30 is greater than that of each bell crank arm extending to the pin 36 for a purpose which will be more fully described hereinafter.

If desired, the horizontal trough 24 may have a member 40 depending from the forward end thereof adapted to receive a sealing member 42 which may be hingedly secured to the bottom surface of the inclined trough 30 as shown. The sealing member 42, when used, is slidable between the member 40 and the bottom of the horizontal trough 24 to prevent fluids from the manure and the like from sliding through the opening between the adjacent ends of the horizontal trough 24 and the inclined trough 30. Where suitable amounts of straw or other litter is provided, the sealing member 42 is not required. Sealing at the sides of the junction between the troughs is provided by the inclined trough 30 overlapping the horizontal trough 24 by a close sliding fit. This edge seal insures the retention of the urine and more fluid types of manure in the conveyer trough where it is mixed with and absorbed by the straw or other litter, the absorption being facilitated by the vibration of the mass during operation of the unit.

Referring now to Fig. 4 of the drawings, the inclined trough 30 can be seen to be held at a predetermined angle of inclination by the supporting means 44 which is determined prior to installation of the cleaner. This supporting means 44 includes a Y member 46 into which vertical legs 48 and inclined legs 50 are secured. If it is desired to change the operating angle of the trough 30, the length of the legs 48 and 50 are varied as required. Joining the Y members is a tie bolt 52. Secured to and extending upwardly from the Y members are lower release bearings 54 which are hingedly connected to upper release bearings 56 for receiving a shaft 58 therebetween. A U-shaped pivot member 60 has its inner ends welded to the shaft 58 and its outer end hingedly connected to the bottom of the inclined trough 30 by a plurality of hinges 62. The upper release bearings 56 have spring means 64 thereon for releasably locking the upper bearing member 56 to the lower release bearing member 54. This construction and arrangement can be seen in Figure 10.

When it is desired to raise the inclined trough 30 to an inoperative position in which its discharge end is sufficiently above its operating position to clear a manure spreader or the like, the upper bearings 56 are released and the shaft 58 is removed therefrom as shown in Figure 9. The supporting means 44 and the inclined trough are then raised to the position shown in Fig. 5 of the drawings. In this position the trough 30 is supported by the U-shaped pivot member 60, shaft 58, support tie bolt 66, and U bolt 68. The U bolt 68 is threadedly secured to each of the inclined legs 50 and is hingedly secured to the tie bolt 66 at 70. The tie bolt 66 is also hingedly secured to the shaft 58 at 72. Each of these hinged connections 70 and 72 have suitable means therein for locking them in the upright position shown. For example, bolts (not shown) or the like may be inserted through the hinged connections 70 and 72 to prevent pivotal movement thereof. From the above description it can be seen that a support means has been provided which will permit the inclined trough 30 to be inclined at a desired angle to permit discharge therefrom directly to a manure spreader or manure storage space, which support also can be used to raise the inclined trough to an inoperative position.

Reference is now made to Figs. 1 and 2 for a description of the power transmission means of the present invention. A power drive pinion 74 is operably driven by the electric motor through the shaft 76. The pinion 74 drives the ring gear 76 which is press-fitted on the cam 78. Cam 78 is of the positive motion type disc cam supported in suitable bearing mountings and formed to give the action required of the roller cam follower 82. The roller cam follower 82 reciprocates the pusher rod 22 which is directly connected to the end 26 of the horizontal trough 24 by any suitable means such as the bolt 84. A suitable guide bearing 86 and offset bearing 88 provide the restraint to sidewise and rotating forces of cam follower 82 as it pushes against the cam 78. The power transmission means is completely enclosed within the housing 89 which contains lubricating oil. Suitable sealing means 91 are provided about pusher rod 22 to prevent oil leakage thereabout. It is to be understood that other types of mechanical movements may be used in place of the cam and follower above described. Such movements may include both spring-loaded or hydraulically actuated power units.

In the form of the invention herein shown and described, the cam 78 as seen in Fig. 2 of the drawings, is rotated in a clockwise direction. The cam 78 is designed so that when the cam follower moves from the point 88a to the point 90 the horizontal trough 24 will be accelerated at a predetermined rate toward the left as seen in Figs. 1 and 2. From the point 90 to the point 90a, the acceleration is to the right but the motion of the cam follower 82 continues to the left and is thus decelerated until stopped at the point 90a. From the point 90a to the point 90b, the cam follower 82 is accelerated to the right thus increasing its velocity until it reaches the point 90b. For most efficient operation, point 92 is located on the cam at such a point that the mass in the trough 24 is still in motion to the left when the follower 82 is contacted by point 92 and the trough 24 remains idle until the point 88a contacts the follower 82 and the cycle is repeated. From the point 90b to the point 92, the cam follower 82 will be accelerated to the left while moving to the right, thus gradually decreasing its velocity until stopped at 92. The effect of the cam action on the cam follower 82 is that the horizontal trough 24 is accelerated in its movement to the right at a more rapid rate than its previous acceleration to the left. From the point 92 back to the point 88a, the cam follower will be held substantially idle. The length of travel of the horizontal trough imparted by the cam follower 82 preferably is of the order of approximately ¾ of one inch in the present embodiment of the invention designed for a particular installation. This distance of travel may be varied as desired to impart the required amount of reciprocating motion to the trough.

A flywheel 94 is provided which is driven directly by the electric motor 20 to prevent undue peak requirements from the motor 20 during the working stroke of the cam 78. A conventional centrifugal clutch 96 between the motor and the flywheel allows the electric motor 20 to obtain a speed near its operating speed before it is required to supply power to the power transmitting unit 18. The engagement of the clutch 96 at this speed provides sufficient power required to start the cam 78 even though it may have been stopped previously on the steep working portion of its face.

From the above description it can be seen that the power transmission unit 18 alternately pushes and pulls the horizontal trough 24 in a controlled reciprocating cycle. The trough 24, from an idle position, is accelerated in the direction of discharge at a rate at which the friction between the manure in the trough and the trough exceeds the inertia force of the mass of the manure, causing the manure to be accelerated at the same rate as the trough. At the end of this portion of the cycle, the trough is accelerated in the opposite direction, thus stopping and then reversing the direction of travel of the trough. This acceleration is at a rate at which the inertia force of the moving mass of manure overcomes the friction forces between the manure and the trough 24 causing the manure to slide along the trough in the direction of discharge. As the trough 24 nears its original idle position, it is smoothly decelerated, bringing it to a stop thus completing a cycle in which the manure has been displaced an increment of distance along the horizontal trough. As this apparatus goes through many cycles, multiple individual increments of the cycles are accumulated to move the manure horizontally to the inclined trough 30. At all times, the manure and litter move in the direction of discharge due to the kinetic energy built up in the mass during its first movement toward the discharge end of the conveyer which causes the mass to continue in such motion during the time the conveyer moves in the opposite direction. The motion of the conveyer is so regulated that its return motion is completed before the kinetic energy built up in the litter and manure mass has been dissipated to the point where its motion toward the discharge end of the conveyer has been stopped. Thus, the actual distance of the travel of the litter and manure is greater than the actual distance of the forward conveyer movement.

As previously explained, the arm of the bell crank attached to the inclined trough has a greater length than that of the arm attached to the horizontal trough 24, thus providing a longer stroke for the inclined trough 30 and preventing a pile up of manure at the point of transfer between the troughs 24 and 30.

As the horizontal trough 24 travels through its cycle, it drives bell crank 32 which in turn transmits a motion to the inclined trough 30 similar to the motion of the horizontal trough 24, except that the length of the stroke has been increased by the ratio of length of arms in bell crank 32 and consequently the magnitude of acceleration has been increased. Also, as is believed to be readily apparent, the motion imparted to inclined trough 30 is not directed parallel with the bottom of the trough 24, but is angularly upward and outward.

Starting from the idle position, the lower end of the inclined trough 30 is accelerated at the angle fixed by the bell crank 32, imparting the same motion to the manure inside it. At the end of this portion of the cycle, the rapid reverse acceleration of the trough 30 takes place. However, the inertia forces of the mass of manure exceed forces of gravity and friction momentarily and thus the manure leaves the surface of the trough in the manner of an object passed angularly into space. During this instant of time, the inclined trough is brought back toward its idle position. Thus, when the manure again lands on the trough its position will be shifted an increment of distance along the trough due to both its own projectile travel and the return of the trough toward its idle position while the manure is in flight.

Reference is now made to Fig. 6 of the drawings, for a showing of a modified type of installation of a barn cleaner embodying the present invention which is designed for installation in a barn having a plurality of parallel horizontal troughs which are connected with a common trough at right angles thereto. In the form of the invention here shown, a horizontal trough 124 is shown operatively connected to the pusher rod 22. A second horizontal trough 126 is disposed with its discharge end extending into the trough 124 and these troughs are operatively connected by means of a bell crank 128. The bell crank 128 has its apex pivotally mounted at 130 and the ends of its arms pivotally mounted respectively to each of horizontal troughs 124 and 126. Thus, it can be seen that as horizontal trough 124 is reciprocated, reciprocating motion also will be imparted to horizontal trough 126. In this manner manure in trough 126 will be conveyed in the direction of the arrow toward its discharge end where it will be discharged to horizontal trough 124. At the discharge end of trough 124 is another horizontal trough 132 which is operatively joined with trough 124 for reciprocation therewith by bell crank 134 pivotally mounted at 130a. Thus, it can be seen that the manure from the horizontal trough 124 will be discharged to the horizontal trough 132 from which it will be discharged to an inclined trough 135 and from there to any suitable storage or spreader means as previously described.

Figs. 7 and 8 show other possible installations of barn cleaner modifications embodying the present invention. Each of these modifications will operate in a manner similar to the forms of the invention previously described. Fig. 7 shows two parallel conveyer troughs actuated by an extension 138 of the pusher rod 22. Fig. 8 shows an arrangement whereby two parallel horizontal troughs 138 may be operatively connected to the horizontal trough 24 for discharge thereinto in the direction indicated by the arrows.

If desired, any suitable provision may be made to operate the conveyer troughs separately or in sequence, rather than simultaneously if necessary to prevent overloading of the unit or to assure an even flow of the materials thereon.

In all of the embodiments of the present invention shown herein, it is intended that the barn cleaner will be operated intermittently, that is, at such times as the barn is to be cleaned. At such times, the cleaner is started and the accumulated material in the trough is moved toward the discharge point. Litter and manure not in the trough can be readily scraped therein, either before starting the unit or while the cleaner is in operation.

From the above description of the various forms of the invention, it can be seen that a barn cleaner has been provided which will not be injurious to animals in the barn while the unit is in operation or while it is idle. The animals can step into the trough with no danger to themselves or to the equipment. The trough is flared at each side, allowing a tight fit with the trench. The top of the trough is open and the interior of the trough is smooth having no paddles or cross members of any kind therein which might catch the hoof of the animal. Similarly, it will be noted that there are no moving parts which will be dangerous to workmen working in the barn.

Further, it can be seen that a barn cleaner has been provided from which the optimum conditions of cleanliness and sanitation within the barn can be obtained. The vibrating movement of the trough keeps in movement all adhesive materials and eliminates sticking manure from clinging to the surface of the trough. Due to the smooth interior of the trough there are no obstructions in the trough to which the manure can stick and harden.

It can be seen also that the power transmission unit can be housed within the barn and there is nothing therein to freeze or break during freezing weather. Also, the unit is simple in construction permitting it to be installed at a low initial cost and is ruggedly built to insure long usage thereof without high maintenance cost.

Having thus described my invention, I claim:

1. In an apparatus for conveying materials through a trench, a trough slidably mounted in said trench, means for reciprocating said trough to cause movement of materials therein toward the discharge end thereof, the sidewalls of said trough being upwardly flared with the upper edges thereof in engagement with the sidewalls of said trench so that when said trough is reciprocated said upper edges will wear a sealing connection with the sides of said trench.

2. In an apparatus for use in cleaning barns including conveyer troughs adapted for conveying manure and the like by reciprocating movement thereof, a power transmitting mechanism comprising a horizontally disposed pusher rod adapted to be secured at its one end to said conveyer trough, and a camming means operatively disposed at the other end of said pusher rod for imparting to said pusher rod movement in one direction at a predetermined rate followed immediately by movement in the opposite direction at a greater rate and thereafter an idling period before repeating the above movements, and a motor for driving said power transmission mechanism, a flywheel drivingly connected to said motor by a centrifugal clutch, said clutch being adapted to engage only after predetermined energy has been stored in said power transmission mechanism.

3. In a barn cleaning apparatus having a power transmitting unit adapted to impart longitudinal reciprocating motion to a conveyer trough, a conveyer system comprising a horizontal conveyer trough mounted for longitudinal reciprocating movement and adapted to receive such movement from said power transmitting unit, an inclined conveyer trough mounted for reciprocating movement and operatively joined to said horizontal conveyer trough by a simple single-piece bell crank, said bell crank having its apex and one of its arms pivotally mounted on said horizontal conveyer trough and inclined conveyer trough respectively, the other arm of said bell crank having a stationary pivotal mounting and being substantially shorter than the first-named arm, whereby a greater rate of acceleration will be imparted to said inclined conveyer trough during reciprocating movement than to said horizontal trough.

DONALD W. GARNETT.

References Cited in the file of this patent

UNITED STATES PATENTS

| Number | Name | Date |
|---|---|---|
| 1,033,219 | Wall | July 23, 1912 |
| 1,895,673 | Luke | Jan. 31, 1933 |
| 2,032,599 | Sloane | Mar. 3, 1936 |
| 2,088,351 | Sloane | July 27, 1937 |
| 2,134,452 | Moore | Oct. 25, 1938 |
| 2,215,338 | Sloane | Sept. 17, 1940 |
| 2,446,965 | Sweeten | Aug. 10, 1948 |